US012673538B2

(12) United States Patent
    Koehler et al.

(10) Patent No.: US 12,673,538 B2
(45) Date of Patent: Jul. 7, 2026

(54) MAIN BODY FOR A MOTOR VEHICLE DOOR

(71) Applicant: Ford Global Technologies, LLC,
              Dearborn, MI (US)

(72) Inventors: Juergen Koehler, Cologne (DE);
              Muhil Raj Govindaraj, Chennai (IN);
              Hari Vigneshwaran, Dharapuram (IN);
              Arul Praveen Aruldoss, Chennai (IN);
              Silvia Bappert, Siegburg (DE)

(73) Assignee: Ford Global Technologies, LLC,
              Dearborn, MI (US)

( * ) Notice:   Subject to any disclaimer, the term of this
              patent is extended or adjusted under 35
              U.S.C. 154(b) by 322 days.

(21) Appl. No.: 18/592,953

(22) Filed:    Mar. 1, 2024

(65)              Prior Publication Data

US 2024/0317031 A1     Sep. 26, 2024

(30)         Foreign Application Priority Data

Mar. 21, 2023   (DE) .......................... 102023107025.8

(51) Int. Cl.
     B60J 5/04              (2006.01)
(52) U.S. Cl.
     CPC ........... B60J 5/0455 (2013.01); B60J 5/0437
               (2013.01); B60J 5/0463 (2013.01)

(58) Field of Classification Search
     CPC ....... B60J 5/0455; B60J 5/0437; B60J 5/0463
     See application file for complete search history.

(56)                References Cited

U.S. PATENT DOCUMENTS 7,448,670 B2   11/2008  Baker et al.
        8,864,213 B2   10/2014  Ohsawa et al.
        9,610,829 B1    4/2017  Stachewicz et al.
        9,815,419 B2 * 11/2017  Halliwell .............. F16B 11/006
     2011/0127797 A1 *  6/2011  Garnett ................ B62D 25/025
                                                          296/204

FOREIGN PATENT DOCUMENTS

CN          203175317 U  *  9/2013
     DE       102010005365 A1     7/2011
     DE       102010053957 A1     6/2012

* cited by examiner

*Primary Examiner* — Faye M Fleming
     (74) *Attorney, Agent, or Firm* — Vichit Chea; Price
     Heneveld LLP

(57)                ABSTRACT

A main body for a motor vehicle door which is produced by
injection molding and has a frame, which has an upper
reinforcing element, which has flanges that protrude from
the upper reinforcing element. It is proposed for the upper
reinforcing element to be integrally formed in one piece on
the frame via at least two articulation elements in a manu-
facturing position in which said upper reinforcing element
protrudes from the frame.

17 Claims, 4 Drawing Sheets

MAIN BODY FOR A MOTOR VEHICLE DOOR

CROSS-REFERENCE TO RELATED APPLICATION

This application claims foreign priority benefits under 35 U.S.C. § 119(a)-(d) to German Application No. 102023107025.8 filed Mar. 21, 2023, which is hereby incorporated by reference in its entirety.

FIELD OF THE DISCLOSURE

The present disclosure generally relates to motor vehicle doors, and more particularly relates to an injection molded main body for a motor vehicle door.

BACKGROUND OF THE DISCLOSURE

The main bodies for motor vehicle doors are an essential part of a motor vehicle, since they are used as the interface between the interior of the vehicle and the internals of the door, and between vehicle occupants and the door. A motor vehicle may be, for example, a passenger motor vehicle, a heavy goods vehicle or a bus, wherein the motor vehicle may be a battery electric vehicle (BEV), a hybrid BEV (HBEV) or may be provided with other drive motors.

The vehicle door main body may be produced from plastics material as an injection-molded part. The materials, in particular plastics materials, required for this are known, wherein materials that comply with the standards and requirements of the vehicle industry are selected. This approach facilitates the production of the main body and also enhances the production efficiencies.

Generally, door trim elements, which are the inner parts of the doors that contain the operating elements and decorative parts, are separately arranged on and fastened to the main body. The main body typically has an upper reinforcing element, which can be connected to the main body. The reinforcing element may extend along an upper region of the main body, and essentially forms an upper frame part of the main body. The reinforcing element usually has flanges, which may also be referred to as fastening ribs and which extend downward in order to connect the door trim elements to the main body.

When the door trim elements, in particular those arranged in the region of the upper reinforcing element, are being installed, the upper reinforcing element itself, or else the downwardly oriented flanges thereof, may get in the way, for which reason it is only after all necessary door trim elements have been installed on the main body that the reinforcing element can then be installed. However, this requires the upper reinforcing element to be produced as a separate component in a special injection-molding tool, and then to be fastened to the main body by way of special tools in such a manner that the function thereof as well as its flanges are arranged in the correct position, in order to hold the door trim elements correctly. This makes handling more difficult and less efficient.

It would be desirable to provide for enhancement of main bodies for motor vehicle doors with door inner trim elements, in particular in terms of the upper reinforcing element.

SUMMARY OF THE DISCLOSURE

According to a first aspect of the present disclosure, a main body for a motor vehicle door which is produced by injection molding, has a frame and an upper reinforcing element which has flanges that protrude from the upper reinforcing element. The upper reinforcing element is integrally formed in one piece on the frame via at least two articulation elements in a manufacturing position in which the upper reinforcing element protrudes from the frame.

Embodiments of the first aspect of the present disclosure can include any one or a combination of the following features:

- in the manufacturing position, the upper reinforcing element protrudes vertically in an upwardly oriented manner, from the frame;
- the frame has vertical struts which are spaced apart from one another, when viewed in a longitudinal direction, and on which the upper reinforcing element is arranged;
- on each of the vertical struts, an attachment to the upper reinforcing element takes place via the articulation elements;
- on the respective end sides of the vertical struts, the attachment to the upper reinforcing element takes place via the articulation elements;
- the articulation elements are in the form of film hinges;
- the upper reinforcing element is transferred around the articulation elements from its manufacturing position into its final installation position;
- locking elements arranged on the upper reinforcing element and on the frame;
- a latching device and a mating latching device provided as the locking elements; and
- the latching and mating latching devices that correspond to one another are provided on respective vertical struts and on the upper reinforcing element.

According to a second aspect of the present disclosure, a main body for a motor vehicle door, which is produced by injection molding, has a frame and an upper reinforcing element which has flanges that protrude from the upper reinforcing element. The reinforcing element is integrally formed in one piece on the frame via the at least two articulation elements in a manufacturing position in which the upper reinforcing element protrudes from the frame. In the manufacturing position, the upper reinforcing element protrudes vertically in an upwardly oriented manner, from the frame. The frame has vertical struts which are spaced apart from one another, when viewed in a longitudinal direction, and on which the upper reinforcing element is arranged.

Embodiments of the second aspect of the present disclosure can include any one or a combination of the following features:

- on each of the vertical struts, the attachment to the upper reinforcing element takes place via the articulation elements;
- on the respective end sides of the vertical struts, an attachment to the upper reinforcing element takes place via the articulation elements;
- the articulation elements are in the form of film hinges;
- the upper reinforcing element is transferred around the articulation elements from its manufacturing position into its final installation position;
- locking elements arranged on the upper reinforcing element and on the frame;
- a latching device and a mating latching device provided as the locking elements; and
- the latching and mating latching devices that correspond to one another are provided on respective vertical struts and on the upper reinforcing element.

These and other features, advantages, and objects of the present disclosure will be further understood and appreciated by those skilled in the art by reference to the following specification, claims, and appended drawings.

DETAILED DESCRIPTION OF PREFERRED EMBODIMENTS

Figures 1A, 1B, 1C:
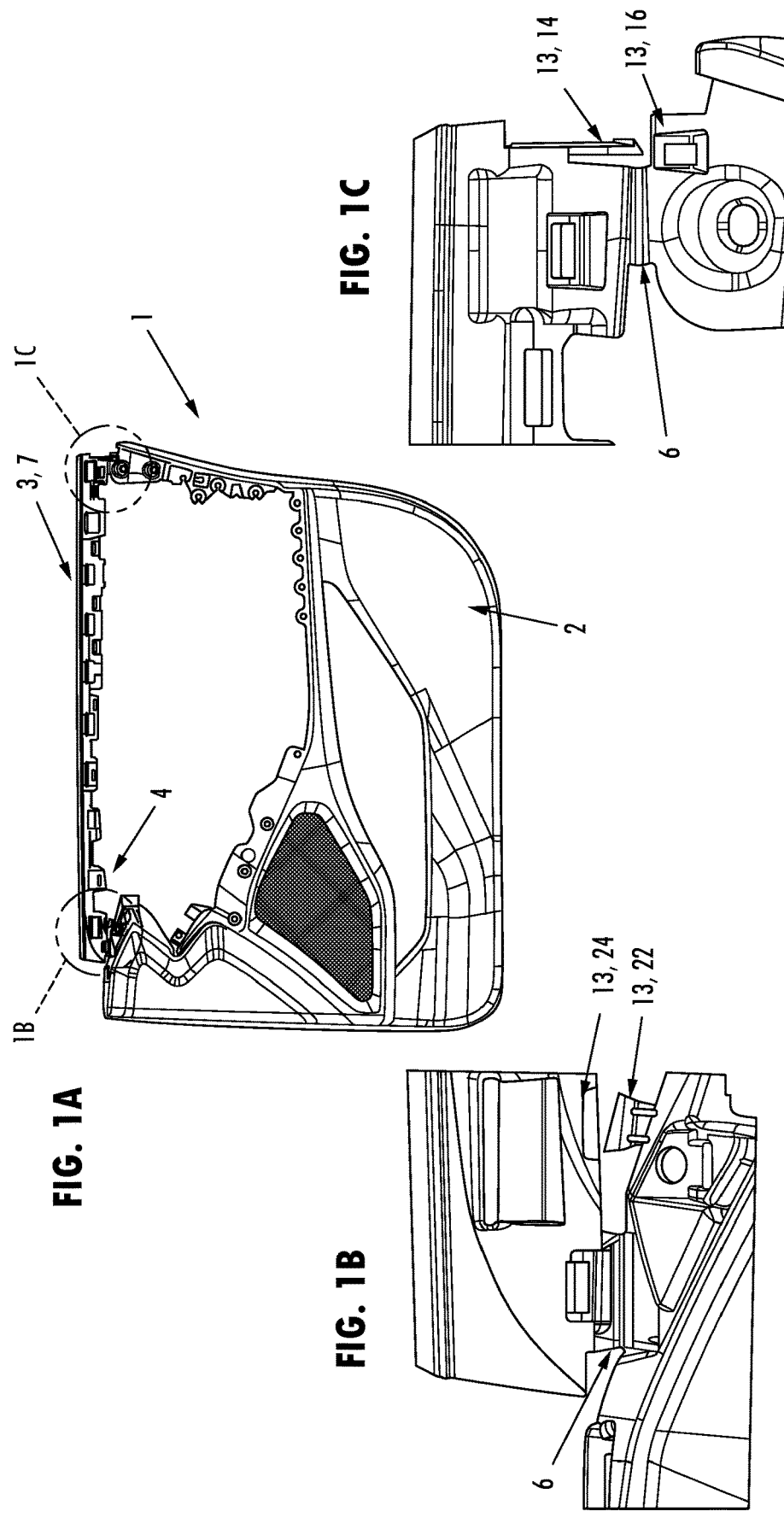
FIG. 1A is a perspective view of a main body of a motor vehicle door with details that illustrate an articulated attachment.
FIG. 1B is an enlarged perspective view of section 1B in FIG. 1A illustrating the articulation element.
FIG. 1C is an enlarged perspective view of section 1C of FIG. 1A illustrating the articulation element.

Reference will now be made in detail to the present preferred embodiments of the disclosure, examples of which are illustrated in the accompanying drawings. Wherever possible, the same reference numerals will be used throughout the drawings to refer to the same or like parts. In the drawings, the depicted structural elements are not to scale and certain components are enlarged relative to the other components for purposes of emphasis and understanding.

As required, detailed embodiments of the present disclosure are disclosed herein; however, it is to be understood that the disclosed embodiments are merely exemplary of the disclosure that may be embodied in various and alternative forms. The figures are not necessarily to a detailed design; some schematics may be exaggerated or minimized to show function overview. Therefore, specific structural and functional details disclosed herein are not to be interpreted as limiting, but merely as a representative basis for teaching one skilled in the art to variously employ the present disclosure.

For purposes of description herein, the terms "upper," "lower," "right," "left," "rear," "front," "vertical," "horizontal," and derivatives thereof shall relate to the concepts as oriented in FIG. 1. However, it is to be understood that the concepts may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The present illustrated embodiments reside primarily in combinations of method steps and apparatus components related to a main body for a motor vehicle door. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

FIG. 1 shows a main body 1 for a motor vehicle door. The main body is produced by injection molding and has a frame 2. The frame 2 has an upper reinforcing element 3, which has flanges 4 that protrude from the latter. The reinforcing element 3 is integrally formed in one piece on the frame 2 via at least two articulation elements 6 in a manufacturing position 7 in which said reinforcing element protrudes from the frame 2.

In the manufacturing position 7, the reinforcing element 3 protrudes, in the plane of the drawing in FIG. 1, in an essentially upwardly oriented manner away from the frame 2. Some of the flanges 4, in particular the longer ones, are arranged at an angle on the reinforcing element 3, and are located approximately in a horizontal position, when the reinforcing element 3 is arranged on the frame 2 in the manufacturing position 7.

Figure 2:
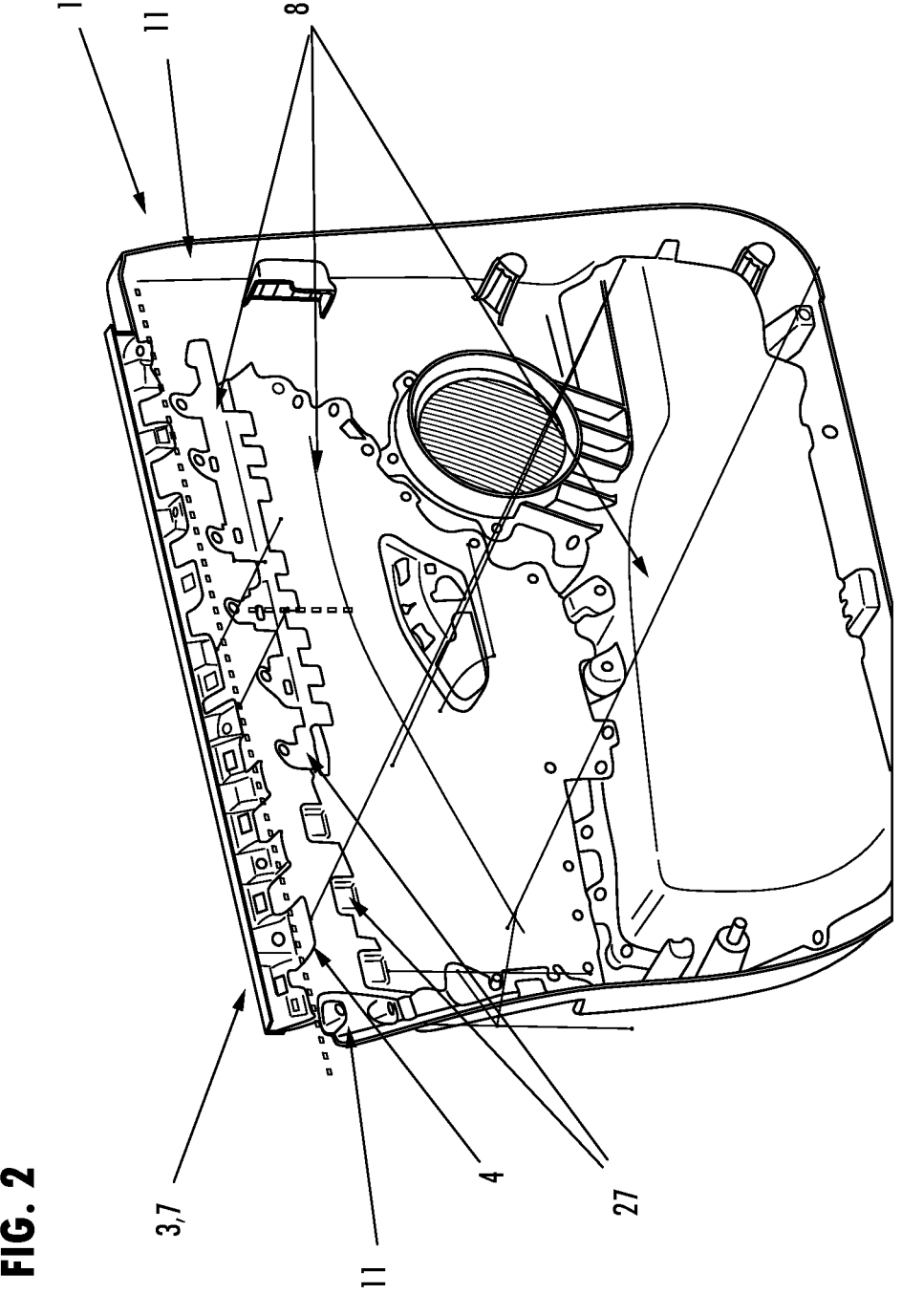
FIG. 2 is a perspective view of the main body illustrated in FIG. 1A with door trim elements arranged thereon.

In the exemplary embodiment illustrated in FIG. 1A, the main body 1 remains free of any door trim elements 8, which are arranged on the main body 1 in the exemplary embodiment according to FIG. 2. Door trim elements 8 are, for example, the inner parts of the doors that contain the operating elements and decorative parts. These may be separately arranged on and fastened to the main body 1, that is to say the frame 2 thereof, despite the presence of the upper reinforcing element 3. It can be seen that the reinforcing element 3, including the flanges 4 thereof, does not get in the way of the installation of the door trim elements 8. This is due to the configuration, specifically the advantageous attachment of the reinforcing element 3 to the frame 2 via at least two points, wherein in this embodiment, two articulation elements 6 are provided.

The frame 2 and the reinforcing element 3, together with the flanges 4 thereof, are produced in one piece by use of plastics material that can be processed by injection molding. In this case, the plastics-material-based injection molding allows a multiplicity of degrees of freedom in terms of the configuration of the component to be produced. In particular, this configuration allows the articulation elements 6, which are used to attach the upper reinforcing element 3 to the frame 2, to be produced in a particularly simple manner. In particular, it is in this case envisaged for the articulation elements 6 to be in the form of film hinges, as can be seen in FIGS. 1B and 1C. The two articulation elements 6 are in this case each arranged in the end region of the reinforcing element 3.

As can be seen in particular from FIGS. 1-3, the reinforcing element 3 is attached to end sides 9 of vertical struts 11 of the frame 2, wherein the articulation elements 6, that is to say the film hinges, are arranged therebetween.

Figure 3B:
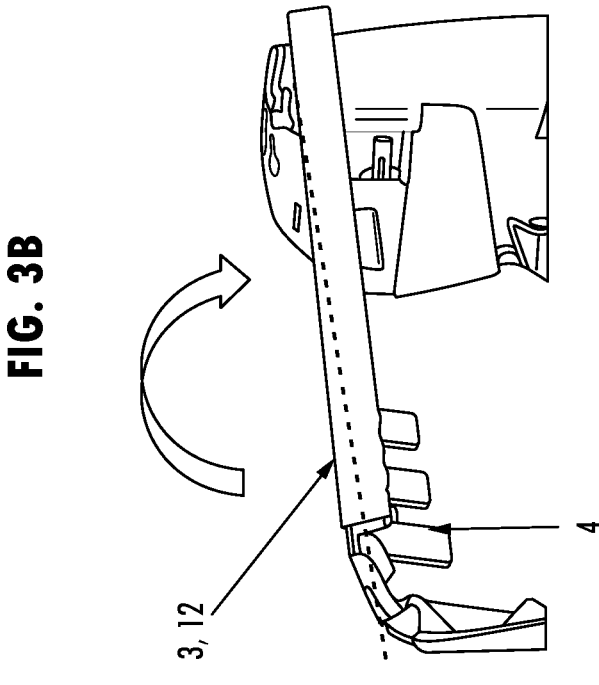
FIG. 3B is a perspective view of the reinforcing element in the final installation position.
Figure 3A:
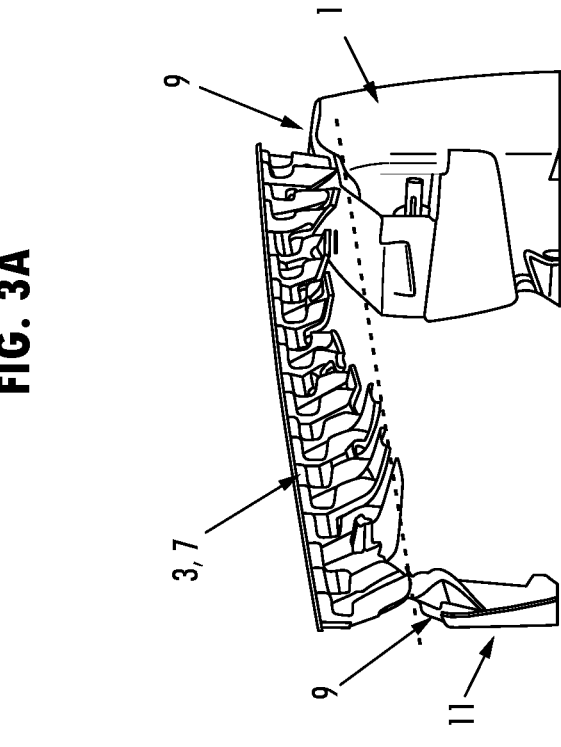
FIG. 3A is a perspective view of the reinforcing element in the manufacturing position.

The flanges 4 also may expediently already have been concomitantly integrally formed during the one-piece production of the frame 2 and reinforcing element 3. In this case, it is advantageous if the flanges are arranged in the manufacturing position 7 in such a manner that the door trim elements 8 can be installed without any complications. As can be seen in the plane of the drawing in FIGS. 1, 2, and 3A, the flanges protrude approximately horizontally from the reinforcing element 3 in the manufacturing position 7. However, in the manufacturing position 7 of the upper reinforcing element 3, the flanges 4 have already been integrally formed in such a manner that they, as a result of the upper reinforcing element 3 being transferred from the manufacturing position 7 into a final installation position 12, as can be seen in FIG. 3B, do not need to be reformed once again. In the final installation position 12, the flanges 4, which may also be referred to as fastening ribs for the respective associated door trim elements 8, are already in the correct position simply as a result of being folded over in the direction of the rotational arrow in FIG. 3B.

If all of the door trim elements 8 have been installed on the main body 1, that is to say on the frame 2 thereof, the upper reinforcing element 3 may be transferred from the manufacturing position 7 into the final installation position 12, as is indicated in FIG. 3B. In order to fix the elements in the final installation position 12, provision is made for locking elements 13, which can be seen in FIGS. 4A and 4B, but are also indicated in FIGS. 1B and 1C.

Figure 4B:
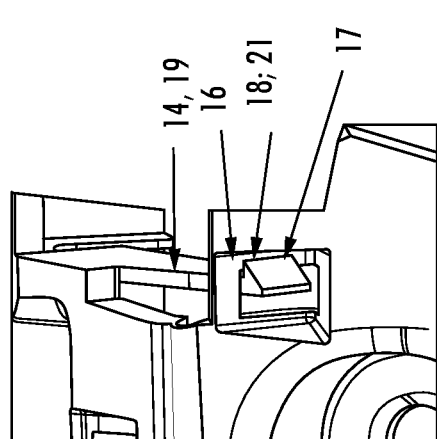
FIG. 4B is an enlarged view from FIG. 3B of the locking element shown in FIG. 1C.
Figure 4A:
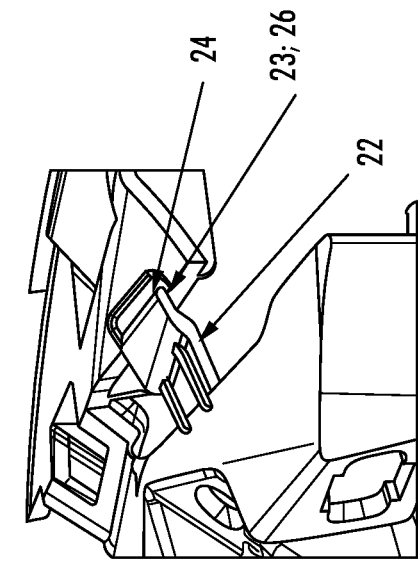
FIG. 4A is an enlarged view from FIG. 3B of the locking element shown in FIG. 1B.

As can be seen most clearly in FIGS. 4A and 4B, the locking elements 13 are preferably in the form of a latching connection. In FIGS. 1B and 1C, the locking elements 13 are disengaged.

In the exemplary embodiment illustrated in FIG. 4B, a latching hook 14, which is engaged with a mating latching element 16 in the final installation position 12, is arranged on the reinforcing element 3. The mating latching element 16 is arranged on the frame 2, that is to say on the right-hand vertical strut 11 in the plane of the drawing in FIG. 1. The latching hook 14 has, at its free end, a conical sliding surface 17 and a latching surface 18. By way of the sliding surface 17, the latching hook 14 slides along the mating latching element 16 during the transfer into the final installation position 12. As a result, the latching hook 14 is essentially deflected as a result of spring force by way of its latching web 19. By way of its latching surface 18, the latching hook 14 engages behind a mating latching surface 21 of the mating latching element 16.

In the exemplary embodiment illustrated in FIG. 4A, a latching hook 22 is arranged with its latching surface 23 on the vertical strut 11, that is to say on the left-hand vertical strut 11 illustrated in the plane of the drawing in FIG. 1, while the mating latching device 24 corresponding thereto is arranged with its mating latching surface 26 as a barb on the reinforcing element 3.

When the reinforcing element 3 is being transferred into the final installation position 12, the respective latching hooks 14, 22 are deflected and then engage, by way of the respective latching surface 18, 23, behind the respective mating latching surface 21, 26.

The final installation position 12 is thus fixed so as to be secured in a force-fitting and form-fitting manner. In FIG. 2, it can also be seen that corresponding mating elements 27 for the flanges 4 are arranged on the associated door trim elements 8.

The main body also makes it possible for the reinforcing element 3 also to be transferred back into the manufacturing position 7 again, if necessary and/or desired. For this purpose, only the locking elements 13, that is to say the respective latching connections, need to be released. On account of the articulation elements 6, that is to say the film hinges, the reinforcing element 3 would then be arranged in the manufacturing position 7 again, and door trim elements 8 could optionally be replaced, before the door trim elements 8 are ultimately connected, no longer in a re-leasable manner, optionally by welding, to one another and also to the frame 2.

A main body for a motor vehicle door is disclosed, which is produced by injection molding and has a frame, which has an upper reinforcing element, which has flanges that protrude from the latter. According to the disclosure, the reinforcing element is integrally formed in one piece on the frame via at least two articulation elements in a manufacturing position in which said reinforcing element protrudes from the frame.

It should be pointed out that the features and measures specified individually in the description may be combined with one another in any desired technically meaningful way and disclose further configurations of the invention. The description additionally characterizes and specifies the invention, in particular in conjunction with the figures.

The disclosure provides a main body for a motor vehicle door that is enhanced in a simple manner in terms of simplified installation of door trim elements. While it was considered necessary in conventional approaches for the reinforcing element to be produced in a separate injection molding step and to be fastened to the frame by way of a special tool, the teachings in this disclosure allow the frame to be produced together with the reinforcing element and thus removes the need for an additional injection-molding tool, as well as tools and outlay for separate installation. Despite being formed in one piece with the frame, the reinforcing element is nevertheless not disruptive during the installation of the door trim elements, since it is advantageously integrally formed on the frame so as to protrude from the latter in the manufacturing position.

In one embodiment, it is preferred if, in the manufacturing position, the reinforcing element protrudes vertically, that is to say in an upwardly oriented manner, from the frame. In a particularly advantageous configuration, at least some of the flanges, in particular the longer ones, protrude laterally, that is to say approximately horizontally, from the reinforcing element in the manufacturing position. This creates a particularly large amount of space for installing the door trim elements, without the flanges of the rein-forcing element getting in the way.

The frame has vertical struts, which are spaced apart from one another, when viewed in the longitudinal direction, and on which the reinforcing element is arranged. In one configuration, on each of the vertical struts, further preferably on the respective end sides of the vertical struts, the attachment to the reinforcing element takes place via the articulation elements, for which reason only two articulation elements, specifically one on each vertical strut, are required.

In an ideal configuration, the articulation elements are in the form of film hinges. The articulation elements, that is to say the film hinges, may be used to pivot the reinforcing element from the manufacturing position into a final installation position, once the necessary door trim elements have been installed on the frame. In the final installation position, the flanges of the reinforcing element come into abutment with the relevant door trim elements or with the mating elements that correspond to the flanges and are arranged on the door trim elements, as a result of which the respective door trim elements are secured in position. In order to ensure that the reinforcing element remains together with the flanges in the final installation position, locking elements, which engage in one another in the final installation position, are expediently provided.

In one configuration, latching device(s) and mating latching device(s) are provided for this purpose. It is expedient if latching and mating latching device(s) that correspond to one another are provided on respective vertical struts and on the reinforcing element.

In a particularly preferred configuration, a latching hook with a latching surface may be provided on one side of the reinforcing element, and a mating latching surface is arranged on the frame, that is to say on the relevant vertical strut. A latching hook with a latching surface is then expediently arranged on the opposite vertical strut, wherein a mating latching surface corresponding thereto is arranged on the rein-forcing element. The reciprocal arrangement of latching hook and mating latching surface enables the final installation position to be particularly effectively secured in position.

It could also be said that, in the manufacturing position, the reinforcing element has a rotated orientation compared to the final installation position. As a result of the rotated orientation of the manufacturing position compared to the final installation position, the disclosure advantageously makes it possible:

a) to install the other door trim elements without colliding with the reinforcing element, as has already been described above; but also, b) to concomitantly integrally form the reinforcing element on the frame as an overall one-piece injection-molded part, cast part or pressed part, which advantageously removes the need for a separate injection-molding tool, casting tool or pressing tool, as well as the logistics and handling for a separate component; and c) to eliminate a slider (movably driven element in the molding tool), which would otherwise be required on account of the different demolding directions of the reinforcing element relative to the frame.

It is to be understood that variations and modifications can be made on the aforementioned structure without departing from the concepts of the present disclosure, and further it is to be understood that such concepts are intended to be covered by the following claims unless these claims by their language expressly state otherwise.

What is claimed is:

1. A main body for a motor vehicle door which is produced by injection molding, the main body comprising:
   a frame; and
   an upper reinforcing element which has flanges that protrude from the upper reinforcing element, wherein the upper reinforcing element is integrally formed in one piece on the frame via at least two articulation elements in a manufacturing position in which the upper reinforcing element protrudes from the frame, wherein the frame has vertical struts which are spaced apart from one another, when viewed in a longitudinal direction, and on which the upper reinforcing element is arranged.

2. The main body according to claim 1, wherein in the manufacturing position, the upper reinforcing element protrudes vertically in an upwardly oriented manner, from the frame.

3. The main body according to claim 1, wherein on each of the vertical struts, an attachment to the upper reinforcing element takes place via the articulation elements.

4. The main body according to claim 3, wherein on the respective end sides of the vertical struts, the attachment to the upper reinforcing element takes place via the articulation elements.

5. The main body according to claim 1, wherein the articulation elements are in the form of film hinges.

6. The main body according to claim 1, wherein the upper reinforcing element is transferred around the articulation elements from its manufacturing position into its final installation position.

7. The main body according to claim 1, further comprising locking elements arranged on the upper reinforcing element and on the frame.

8. A main body for a motor vehicle door which is produced by injection molding, the main body comprising:
   a frame;
   an upper reinforcing element which has flanges that protrude from the upper reinforcing element, wherein the upper reinforcing element is integrally formed in one piece on the frame via at least two articulation elements in a manufacturing position in which the upper reinforcing element protrudes from the frame;
locking elements arranged on the upper reinforcing element and on the frame; and
a latching device and a mating latching device provided as the locking elements.

9. The main body according to claim 8, wherein the latching and mating latching devices that correspond to one another are provided on respective vertical struts and on the upper reinforcing element.

10. A main body for a motor vehicle door, which is produced by injection molding, the main body comprising:
a frame; and
an upper reinforcing element which has flanges that protrude from the upper reinforcing element, wherein the reinforcing element is integrally formed in one piece on the frame via the at least two articulation elements in a manufacturing position in which the upper reinforcing element protrudes from the frame, wherein in the manufacturing position, the upper reinforcing element protrudes vertically in an upwardly oriented manner, from the frame, and wherein the frame has vertical struts which are spaced apart from one another, when viewed in a longitudinal direction, and on which the upper reinforcing element is arranged.

11. The main body according to claim 10, wherein on each of the vertical struts, the attachment to the upper reinforcing element takes place via the articulation elements.

12. The main body according to claim 11, wherein on the respective end sides of the vertical struts, an attachment to the upper reinforcing element takes place via the articulation elements.

13. The main body according to claim 10, wherein the articulation elements are in the form of film hinges.

14. The main body according to claim 10, wherein the upper reinforcing element is transferred around the articulation elements from its manufacturing position into its final installation position.

15. The main body according to claim 10, further comprising locking elements arranged on the upper reinforcing element and on the frame.

16. The main body according to claim 15, further comprising a latching device and a mating latching device provided as the locking elements.

17. The main body according to claim 16, wherein the latching and mating latching devices that correspond to one another are provided on respective vertical struts and on the upper reinforcing element.

*     *     *     *     *